(12) United States Patent
Hernandez et al.

(10) Patent No.: US 10,681,023 B2
(45) Date of Patent: Jun. 9, 2020

(54) SELF-SERVICE PORTAL FOR PROVISIONING PASSWORDLESS ACCESS

(71) Applicant: SSH Communications Security OYJ, Helsinki (FI)

(72) Inventors: Roman Hernandez, Espoo (FI); Tomi Salo, Helsinki (FI); Antti Huima, Espoo (FI); Tatu J. Ylonen, Espoo (FI)

(73) Assignee: SSH Communications Security OYJ, Helsinki (FI)

( * ) Notice: Subject to any disclaimer, the term of this patent is extended or adjusted under 35 U.S.C. 154(b) by 75 days.

(21) Appl. No.: 14/319,319

(22) Filed: Jun. 30, 2014

(65) Prior Publication Data

US 2015/0006882 A1 Jan. 1, 2015

Related U.S. Application Data

(60) Provisional application No. 61/840,538, filed on Jun. 28, 2013.

(51) Int. Cl.
*H04L 29/06* (2006.01)

(52) U.S. Cl.
CPC .......... *H04L 63/06* (2013.01); *H04L 63/0823* (2013.01); *H04L 63/0838* (2013.01)

(58) Field of Classification Search
CPC . H04L 63/06; H04L 63/0823; H04L 63/0838; H04L 63/10
See application file for complete search history.

(56) References Cited

U.S. PATENT DOCUMENTS 5,887,063 A * 3/1999 Varadharajan ...... H04L 63/0492
713/172
6,301,661 B1 10/2001 Shambroom
(Continued)

FOREIGN PATENT DOCUMENTS

WO 2013009621 A1 1/2013
WO 2013093209 A1 6/2013

OTHER PUBLICATIONS

"An SSH Key Management System: Easing the pain in Managing Key/User/Account Association", International Conference on Computing in High Energy and Nuclear Physics, Journal of Physics: Conference Series 119, IOP Publishing, 2008 (pp. 1-6).
(Continued)

*Primary Examiner* — Chau Le
*Assistant Examiner* — Vance M Little
(74) *Attorney, Agent, or Firm* — Banner & Witcoff, Ltd.

(57) ABSTRACT

Methods and apparatuses for managing access to hosts in a computerized system are disclosed. A request for an authenticator for enabling access to at least one host in the computerized system is communicated from an user to a portal. The portal verifies the right of the user to make the request, and in response to positive verification authorizes the user to make the request and sends the request to an authenticator manager to trigger providing of an authenticator for enabling access to at least one host in accordance with the request. The authenticator manager provides the authenticator for enabling access to the at least one host in accordance with the request. Acceptance of the request by an administration process according a predefined rule is required before said providing of the authenticator.

27 Claims, 14 Drawing Sheets

(56) References Cited

U.S. PATENT DOCUMENTS

| | | | |
|---|---|---|---|
| 7,379,984 B1* | 5/2008 | Green | G06F 21/335 709/220 |
| 8,015,594 B2 | 9/2011 | Salowey et al. | |
| 8,214,844 B2 | 7/2012 | Grover | |
| 8,539,562 B2 | 9/2013 | Bolik et al. | |
| 2003/0110131 A1* | 6/2003 | Alain | G06F 21/6209 705/51 |
| 2003/0226036 A1* | 12/2003 | Bivens | H04L 63/0815 726/8 |
| 2004/0117370 A1* | 6/2004 | Dutta | G06F 19/328 |
| 2006/0130126 A1* | 6/2006 | Touve | H04L 63/0815 726/5 |
| 2006/0206922 A1* | 9/2006 | Johnson | H04L 63/029 726/4 |
| 2006/0236096 A1* | 10/2006 | Pelton | H04L 63/06 713/155 |
| 2006/0259950 A1* | 11/2006 | Mattsson | G06F 21/6227 726/1 |
| 2007/0118735 A1 | 5/2007 | Cherrington | |
| 2008/0086502 A1* | 4/2008 | Kohlscheen | G06Q 10/10 |
| 2008/0134286 A1* | 6/2008 | Amdur | G06F 21/604 726/1 |
| 2008/0222416 A1* | 9/2008 | Kiwimagi | G06F 21/33 713/171 |
| 2009/0150320 A1* | 6/2009 | Geppert | G06F 21/31 706/47 |
| 2011/0185055 A1 | 7/2011 | Nappier et al. | |
| 2011/0252459 A1* | 10/2011 | Walsh | G06F 21/33 726/4 |
| 2013/0111561 A1* | 5/2013 | Kaushik | H04L 63/105 726/4 |

OTHER PUBLICATIONS

EP Search Report of Application No. 14175776..5-1870, dated Nov. 13, 2014.
Supplementary European Search Report of EP Application No. 12859641, dated Aug. 14, 2015.
XP-002342178, Applied Cryptography, Second Edition, Passage, Jan. 1, 1996, Applied Cryptography: Protocols, Algorithms and Source Code in C, John Wiley & Sons, New York, pp. 56-59.
Singaporean Search Report of Application No. 11201403482T dated Sep. 4, 2015, 4 pages.
Singaporean Written Opinion of Application No. 11201403482T, dated Sep. 10, 2015, 5 pages.
Napier, James A., "Secure Automation: Achieving Least Privilege with SSH, Sudo and Setuid," 2004 LISA XVIII, Nov. 14-19, 2014, Atlanta, Georgia, retrieved Feb. 9, 2019 from https://www.usenix.org/legacy/event/lisa04/tech/full_papers/napier/napier.pdf, 10 pages.
Thorpe, Christopher, "SSU Extending SSH for Secure Root Administration," Proceeding of the Twelfth Systems Administration Conference (LISA '98), Dec. 6-11, 1998, Boston, Massachusetts, retrieved Feb. 9, 2019 from http://static.usenix.org/event/lisa98/full_papers/thorpe/thorpe.pdf, 11 pages.

* cited by examiner

SELF-SERVICE PORTAL FOR PROVISIONING PASSWORDLESS ACCESS

CROSS-REFERENCE TO RELATED APPLICATIONS

This application claims priority under 35 U.S.C. § 119 to U.S. Provisional Application Ser. No. 61/840,538, filed Jun. 28, 2013, the disclosure of which is incorporated herein by reference.

TECHNICAL FIELD

Certain embodiments of this invention relate to identity and access management in computer systems and provisioning of access to at least one host.

BACKGROUND OF THE INVENTION

Key management systems can be used to manage cryptographic access control keys, and hence, access control, across computer networks. An example of key management systems is the Universal SSH (Secure Shell) Key Manager from SSH Communications Security, Inc. Typically, key management services provide functionality for discovering existing keys and trust relationships between them, as well as installing, rotating (meaning replacing), and removing keys in a centralized and controlled manner. Known key management systems, however, do not work in situations where client computers, that is, computers from which cryptographic connections are taken that terminate on server computers, cannot be accessed by a key management system. That can happen, for instance, when a client computer is the personal property of an employee or a freelancer who does not want to subject the computer to remote management procedures. When a client computer is not accessible by a key management system, the key management system cannot generate new private keys on the computer, nor can it access existing private keys or their public key counterparts on the computer, and thus it cannot grant access to the user or users of that client computer on the server computers within a managed network. Therefore efficient use of key management systems may be restricted to managed networks where connections from clients that are not managed by a key management system are not anticipated.

BRIEF SUMMARY OF THE INVENTION

According to an aspect there is provided a method for managing access to at least one host in a computerized system, comprising receiving at an authenticator manager from an user via a portal a request for an authenticator for enabling access to at least one host in the computerized system, wherein the request can be processed by the authenticator manager only after authorization of the user to make the request by the portal and acceptance of the request for an authenticator by an administration process according a predefined rule, and providing by the authenticator manager the authenticator for enabling access to the at least one host in accordance with the accepted request by the authorized user.

According to an aspect there is provided a method for providing authenticators for enabling access to at least one host in a computerized system, comprising receiving at a portal from a user a request for an authenticator for enabling access to at least one host in a computerized system, verifying the right of the user to make the request by the portal, and in response to positive verification authorizing the user to make the request, and in response to the authorization, sending the request to an authenticator manager for triggering providing of an authenticator for enabling access to at least one host in accordance with the request, wherein acceptance of the request by an administration process according a predefined rule is required before said providing of the authenticator.

According to an aspect there is provided an apparatus comprising at least one processor and at least one memory, said memory being connected to said processor and including computer-readable executable program code for causing the apparatus at least to manage access to hosts in a computerized system, the management comprising at least receiving from an user via a portal a request for an authenticator for enabling access to at least one host in the computerized system, wherein the request can be processed only after authorization by the portal of the right of the user to make the request and acceptance of the request for an authenticator by an administration process according a predefined rule, and providing the authenticator for enabling access to the at least one host in accordance with the accepted request by the authorized user.

According to an aspect there is provided an apparatus in a computerized system, the apparatus comprising at least one processor and at least one memory, said memory being connected to said processor and including computer-readable executable program code for causing the apparatus at least to receive from a user a request for an authenticator for enabling access to at least one host in the computerized system, verify the right of the user to make the request and in response to positive verification authorize the user to make the request, and in response to the authorization, trigger providing of an authenticator for enabling access to at least one host in accordance with the request by sending the request to an authenticator manager, wherein acceptance of the request by an administration process according a predefined rule is required before said providing of the authenticator.

Non-transitory computer program products stored on a computer-readable medium comprising computer-readable program code operable to cause a computer to provide any of the herein described methods can also be provided.

BRIEF DESCRIPTION OF THE DRAWING(S)

Certain embodiments are illustrated in the attached drawings.

DETAILED DESCRIPTION OF THE DRAWINGS

Various aspects of the invention will now be described in view of the drawings. It is clear to a person skilled in the art that many variations of the embodiments are possible; for example, method steps could be rearranged, divided, combined, or executed by different parts of a system or apparatus, and any action indicated as performed may just be caused to be performed (and actually executed by a different component). Some flowcharts include steps that may be omitted in another embodiment. In many cases, flowchart steps may be performed in quick sequence, but in some embodiments, performing a step in a flowchart may take weeks or months as in large-scale environments a computer might have a maintenance window only, e.g., once per month, and updates need to be limited to such maintenance windows, or the entire infrastructure might be locked down from changes for months (e.g., during a typical lock-down period before Christmas in the retail industry). Also, since many of the described steps are something a management system performs, or causes to be performed, on a managed computer, and the managed computer may be unavailable at any given time due to system crashes, network outages, maintenance, testing, or other reasons, the management system should normally be able to retry actions that were not successful initially at a later time. A higher-level flowchart might only continue after an earlier operation has been completed on all related computers. One must also take into account that a computer may break and be decommissioned at any time, and the management system should eventually complete any outstanding operations for such decommissioned systems in order to not leave related higher-level operations incomplete (which might at least confuse users). Given the examples herein, a person skilled in the art should be able to implement the required details in the other embodiments as well (not all described embodiments include all the details to improve clarity and keep the length of the description reasonable).

Figure 1A:
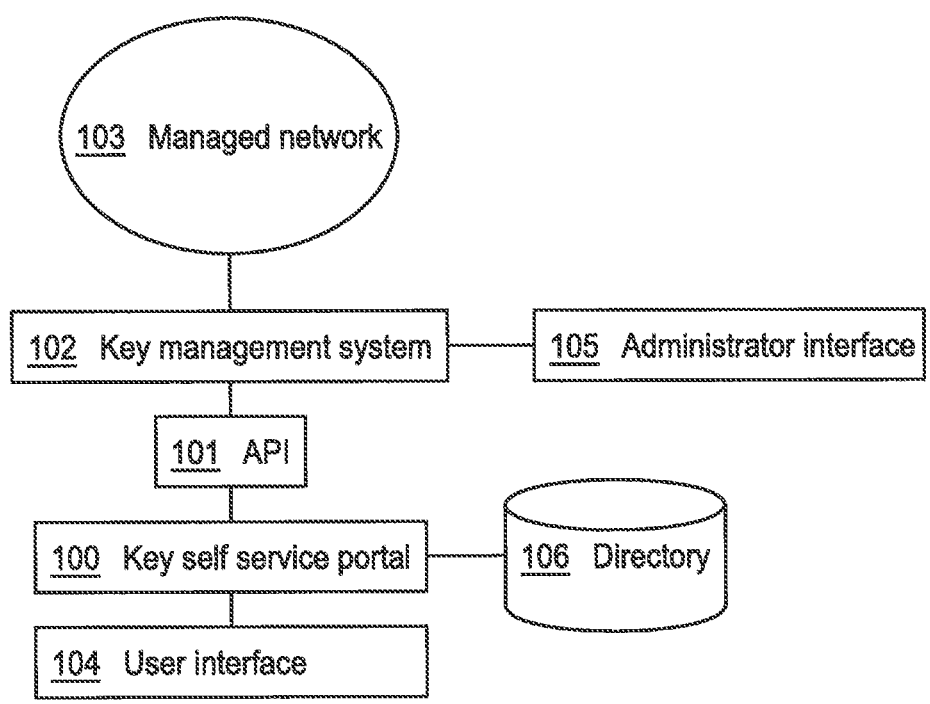
FIG. 1A illustrates a first arrangement of computer services to manage access control on a managed network.

FIG. 1A illustrates an arrangement of computer systems for self-service key management. In an embodiment, computer system providing key management services (102) for system administrator users, is connected to another computer system, a key self-service portal (100) that provides self-service key management services for users through an user interface. Those users can be, for example, system administrators who need to provision access to a service account for an automated process. An administrator may need to input an acceptance via the user interface. The key self-service portal (100) is also connected to a directory service (106), such as Active Directory, for access control of users attempting to use the portal. The key management system (102) and the key self-service portal (100) can be connected to each other with an application programming interface (API) (101). The API can be, for example, an REST (Representational State Transfer) API, implemented as a set of URLs (Uniform Resource Locators) and URL patterns that a client to the API can invoke over HTTP (Hypertext Transfer Protocol) or HTTPS (Secured HTTP) to pass over parameters and other data for an API call as JSON (JavaScript Object Notation) objects. It is also possible that the API (101) is based on another technology. For example, the API can be based on SOAP (Simple Object Access Protocol) and XML (Extensible Markup Language) encoding, or it can be a remote procedure call (RPC) interface such as a CORBA or a DCOM interface, or it can be a programming language level API such as a C++ or a Java™ interface, or the API (101) can be hidden in the sense that the key service portal (100) and the key management system (102) are actually implemented as a single monolithic system without a publicly visible interface between them.

A user interface can be presented to the administrator in response to determination by the administration process that the request cannot be accepted without intervention by the administrator. The key management system (102) can provide the administrator user interface (105) for administrator users, so that administrator users can use the system to manage authenticators such as cryptographic access control keys within a managed network (103). For example, the user interface (105) can be a web interface, implemented using appropriate technologies for implementing web interfaces; for example, an application server such as Apache Tomcat, running Java™ servlets, or a web application framework such as Django™, running Python™ code. A web interface can be implemented as a monolithic implementation or using a modular approach, for example, by dividing the implementation into a presentation layer, a business logic layer, and a database layer.

The key management system (102) can be, for example, Universal SSH Key Manager. The key management system can provide services such as installing access-granting public keys on hosts or groups of hosts, removing such keys, updating and rotating them, and installing and removing private keys that are used to authenticate against public keys on the same or different hosts. The key management system can also provide services for discovering, cataloguing, and auditing keys and relationships between them within the managed network (103), and for calculating and visualizing metrics thereof.

Figure 1B:
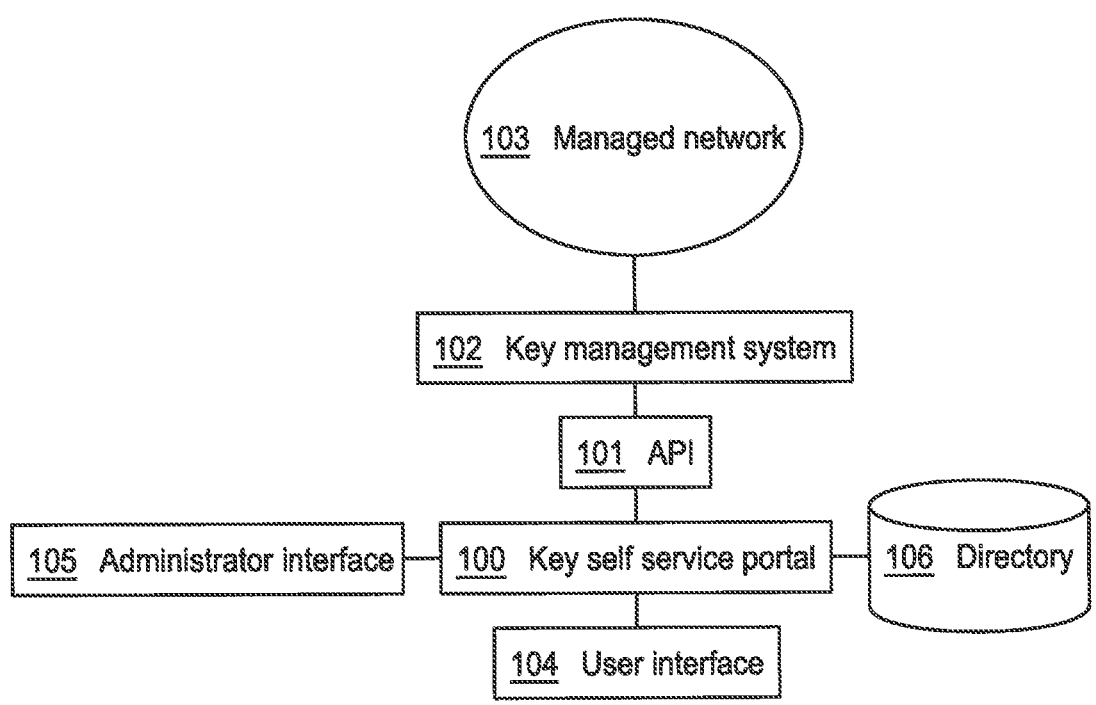
FIG. 1B illustrates a second arrangement of computer services to manage access control on a managed network.

FIG. 1B illustrates an alternative arrangement that differs from the previously presented embodiment in that the administrator interface (105) is connected to the key self-service portal (100) instead of the key management system (102). As will be described in detail later, in this alternative embodiment decisions about self-managed authenticators are carried out within the key self-service portal (100) instead of the key management system (102).

In this specification, the noun key management system is used to refer to a system that manages authenticators and/or access to or in information systems. Authenticators may be public keys but possibly also other types of authenticators, such as shared symmetric cryptographic keys or references to external authentication systems. Authenticators may also be key pairs according to a public key cryptosystem, represented by identification of the public key. A private key in such system may be stored in, e.g., a file, a smartcard, a hardware security module (HSM), or a trusted platform module (TPM)).

The key self-service portal (100) provides a user interface (104) for users to be able to use the portal, for example, as a web interface, or a desktop application, and multiple different user interfaces can be provided instead of a single one. Alternatively, either of the user interfaces (104), (105) can be an asynchronous e-mail interface, for example, based on an SMTP (Simple Mail Transfer Protocol) but only accepting e-mails whose authenticity can be established, for example, by using S-MIME (Secure/Multipurpose Internet Mail Extensions) or PGP (Pretty Good Privacy), two standards for e-mail authentication and encryption; or an asynchronous interface based on sending and receiving SMS messages, in which case trust in an SMS message can be based on the known difficulty of forging the originating phone's number, or the messages can be authenticated with a second factor authentication such as one-time passwords. Alternatively, either one can be an application on a mobile phone or a smartphone.

The key self-service portal (100) is also connected to a directory service (106), such as Active Directory, for enacting access control of users attempting to use the portal, as is described in detail below.

The above described apparatus can be used to provide a method for managing rights to access hosts in a computerized system where an authenticator manager receives from an user via a portal a request for an authenticator for enabling access to at least one host in the computerized system. The request can be processed by the authenticator manager only after authorization of the user to make the request by the portal and acceptance of the request for an authenticator by an administration process according a predefined rule provided either by the authenticator manager or the portal. The right of the user to make the request is verified by the portal which triggers providing of an authenticator for enabling access to at least one host in accordance with the request by sending the request to the authenticator manager. The authenticator manager can then provide the authenticator for enabling access to the at least one host in accordance with the accepted request by the authorized user. The method of claim 1, comprising accepting the request by the administration process at the authenticator manager.

Figure 2A:
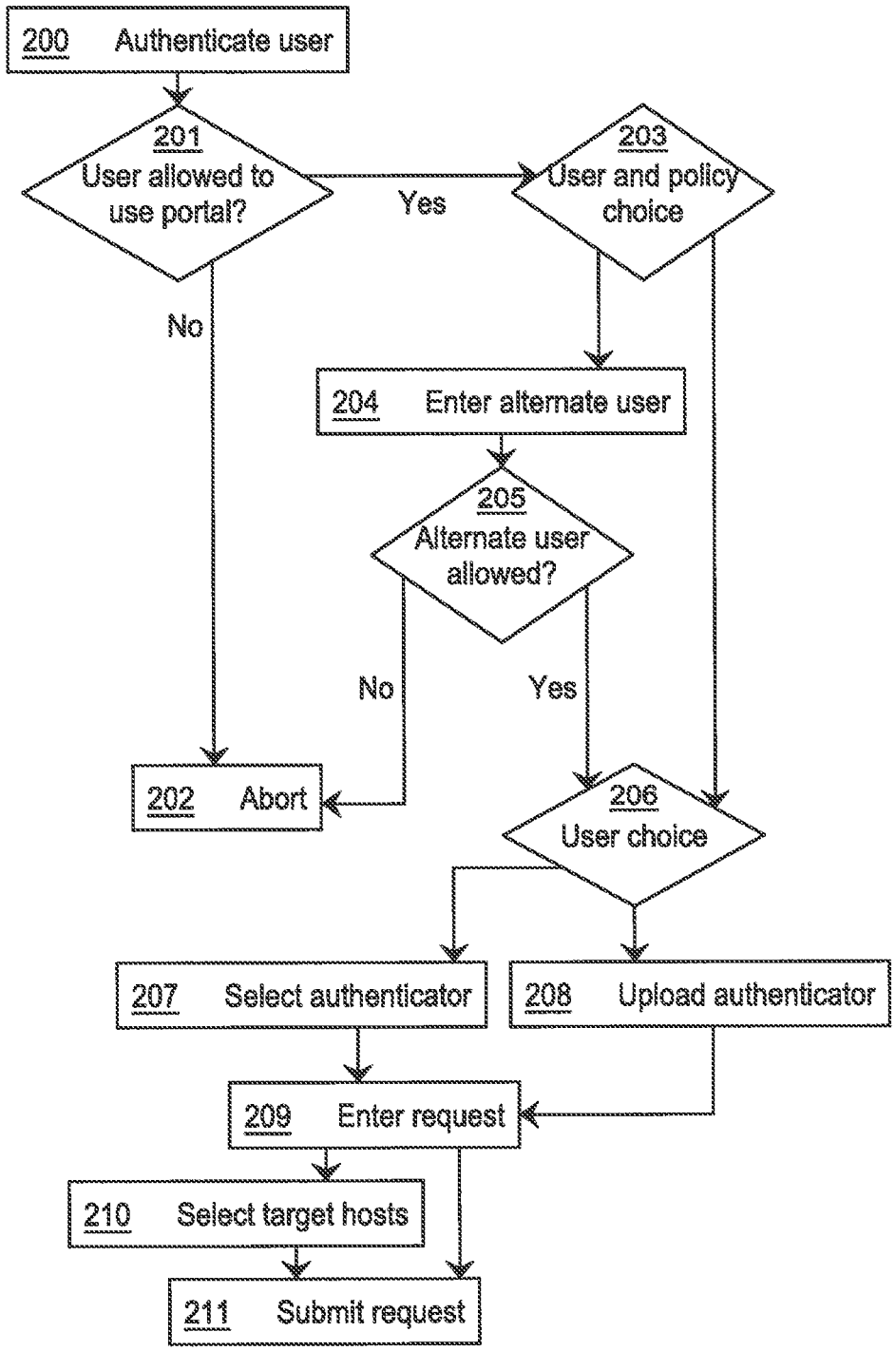
FIG. 2A illustrates a method for requesting the installation of a new authenticator.

A user can use the key self-service portal (100) to request installation of an authenticator such as a public key onto one or more hosts on a managed network (103). An example of this is illustrated in detail in FIG. 2A.

First, the user logs in to the portal (200), for example, by providing access credentials such as a user name and a password that the portal checks against an authentication service on a network host, such as an Active Directory (AD) (106). The access credential can be input via user interface element that is part of the user interface (104). Once the user has been authenticated, for example, by receiving an affirmative authentication response from the AD, the portal checks if the user is allowed to use the portal (201). This check can be based, for example, by comparing the user group of the authenticated user to a list of user groups that are allowed to use the portal. If the user is not allowed to use the portal, the portal does not allow the user to proceed, but aborts the process (202). Users may furthermore have different privilege levels for the use of the portal, such as the right to request new authenticator installations.

An authenticated user can be allowed to make an authenticator installation request on behalf of a second user. Again, the decision if the authenticated user is allowed to represent a second user in this manner can be based, for example, on the user group of the authenticated user. If the authenticated user is allowed to represent a second user and the authenticated user chooses to do so (203), the portal provides an interface element for choosing a second user (204). The portal then checks if this second user can be represented by the authenticated user (205) (or otherwise requests installation of an authenticator for the second user). This check can be based on querying a directory service for the group of the second user, and then querying a directory service for groups that the authenticated user is allowed to represent, and then checking if the second user belongs to at least one of those groups. If the authenticated user is not allowed to represent the second user, the process aborts (202).

In what follows, the term "represented user" shall be construed to denote the second user chosen by the authenticated user, if the authenticated user chose to represent a second user, and the authenticated user otherwise.

The authenticated user can then choose (206) to either upload an authenticator (208), for example, by using the file upload mechanisms available in common browsers when the user interface (104) is a web interface and provides a user interface element for that, or by manually typing in a text encoding of authenticator data into a user interface element that is a text input element, or by using a computer's clipboard functionality to cut-and-paste it into an edit box into a similar text input element. According to a possibility the authenticated user can be provided an option to select from a set of keys that the user has earlier provided to the system (207), for example, using a drop-down menu. In this case those keys are stored either at the portal or at the key management system, or both.

The user then enters a request (209) at a user interface element that describes to an administrator user where and for what kind of access the user requests the authenticator to be installed. This request can include a host name, or multiple host names, or a host group, or a subnet, or a work group name, or combinations thereof (jointly called target host(s) of the request). The request can also include user IDs for which the authenticator should be associated on the host (jointly called target user account(s) of the request). Command restrictions and/or other constraints imposed on the activities that can be carried out by a user authenticating using the authenticator on the hosts on which it is requested to be installed may also be included. The request can be in free text form or it can be structured. If the request is structured, in an alternative embodiment the user is provided a user interface element to list those hosts and host groups where the user asks the authenticator to be installed (210). The hosts can be identified by their IP addresses, or by their fully qualified DNS (Domain Name Service) names, or by Windows™ domain names, or their MAC™ addresses, or by other names given to them within the key management system that can be mapped to host addresses, for example, by using a database.

The target hosts or target users may also be selected from a set of hosts or user accounts associated with the first user (for example, the groups the first user is a member of in Active Directory may specify which hosts the user is able to select). The set of users that can be selected may similarly depend on groups or other configuration for the user, and may also depend on the host. The user then submits the request (211).

Figure 2B:
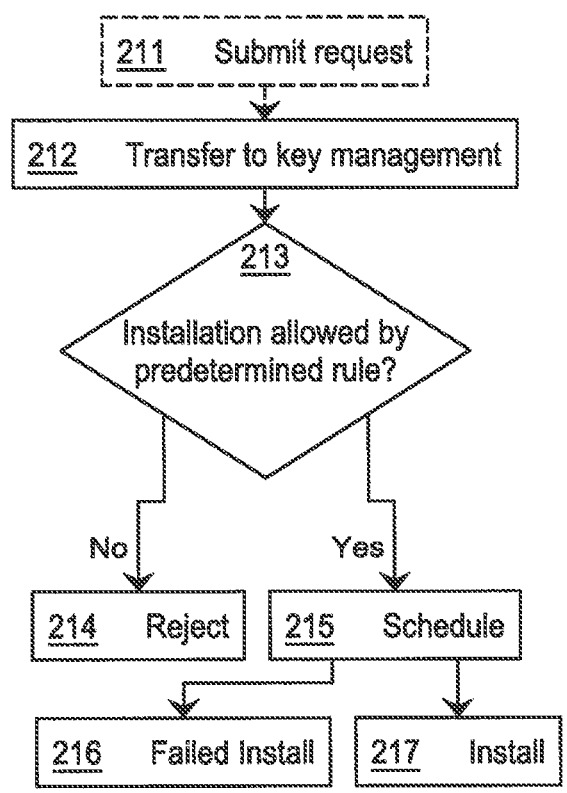
FIG. 2B illustrates a method for deciding on an authenticator installation request after transferring it to a key management system.

Now referring to FIG. 2B, after submission, the public key and the request, as well as information about the identities of the authenticated user and the represented user, are transferred to the key management system (212) through the API (101), either immediately or asynchronously. Other information can be also passed on, such as other user-related information that was obtained from the directory service used to perform authentication against, if any. Then, a predetermined rule (213) is used to check if installing the authenticator for the represented user as requested is allowed. If not, the authenticator is not installed anywhere, but a notification can be provided to the authenticated user that the request was rejected (214), for example, by sending an automatically generated e-mail message. If the request is deemed to be allowed, it is scheduled for fulfillment (215). The scheduling decision, i.e., when to install the authenticator on which hosts, can depend on the configuration and features of the key management system, and different hosts can be scheduled at different times for fulfillment. It is possible that fulfillment requests are batched together, or that they are implemented instantaneously, or that they must be manually triggered.

If the scheduled installation succeeds (217), the authenticated user can be provided with a notification, such as an e-mail message, that the authenticator has been installed successfully for the represented user. If the installation fails (216), the authenticated user can be also notified. It is also possible that the installation succeeds only partially, for example, that some hosts were not available for installing whereas some others were. In that case, the installation can be optionally unrolled on all hosts, and the authenticated user can be notified.

Figure 2C:
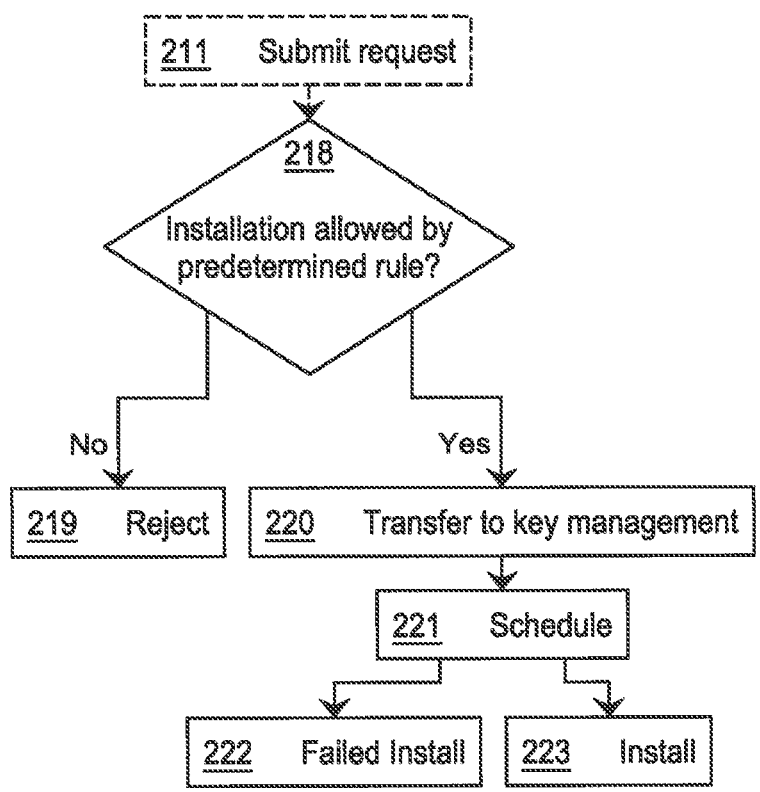
FIG. 2C illustrates a method for deciding on an authenticator installation request before transferring it to a key management system.

This method, as illustrated in FIG. 2B, pertains to those embodiments where the administrator interface (105) is connected to the key management system (102), as illustrated in FIG. 1A, because the predetermined rule (213) may require input from an administrator, as described below. If the installation is allowed by the predetermined rule, installation is scheduled (215), and installation performed (217) unless failure is detected (216). If the predetermined rule does not allow the installation (213), the installation is rejected (214). FIG. 2C illustrates a variation of this method, useful in those embodiments where the arrangement illustrated in FIG. 1B is used, as in those cases the administrator interface (105) is connected to the self-service portal (100), and thus the predetermined rule (213) has to be evaluated at the self-service portal (100) because, as described below, it may require input from an administrator. If the installation is allowed by the predetermined rule (218), the task is transferred to key management (220), installation is scheduled (221), and installation performed (223) unless failure is detected (222). If the predetermined rule does not allow the installation (218), the installation is rejected (219).

Various checks may be also performed on the authenticator, for example, checking that it has not been used before, or that its properties conform to a predetermined policy, such as choice of cryptographic algorithms or key sizes.

Figure 3A:
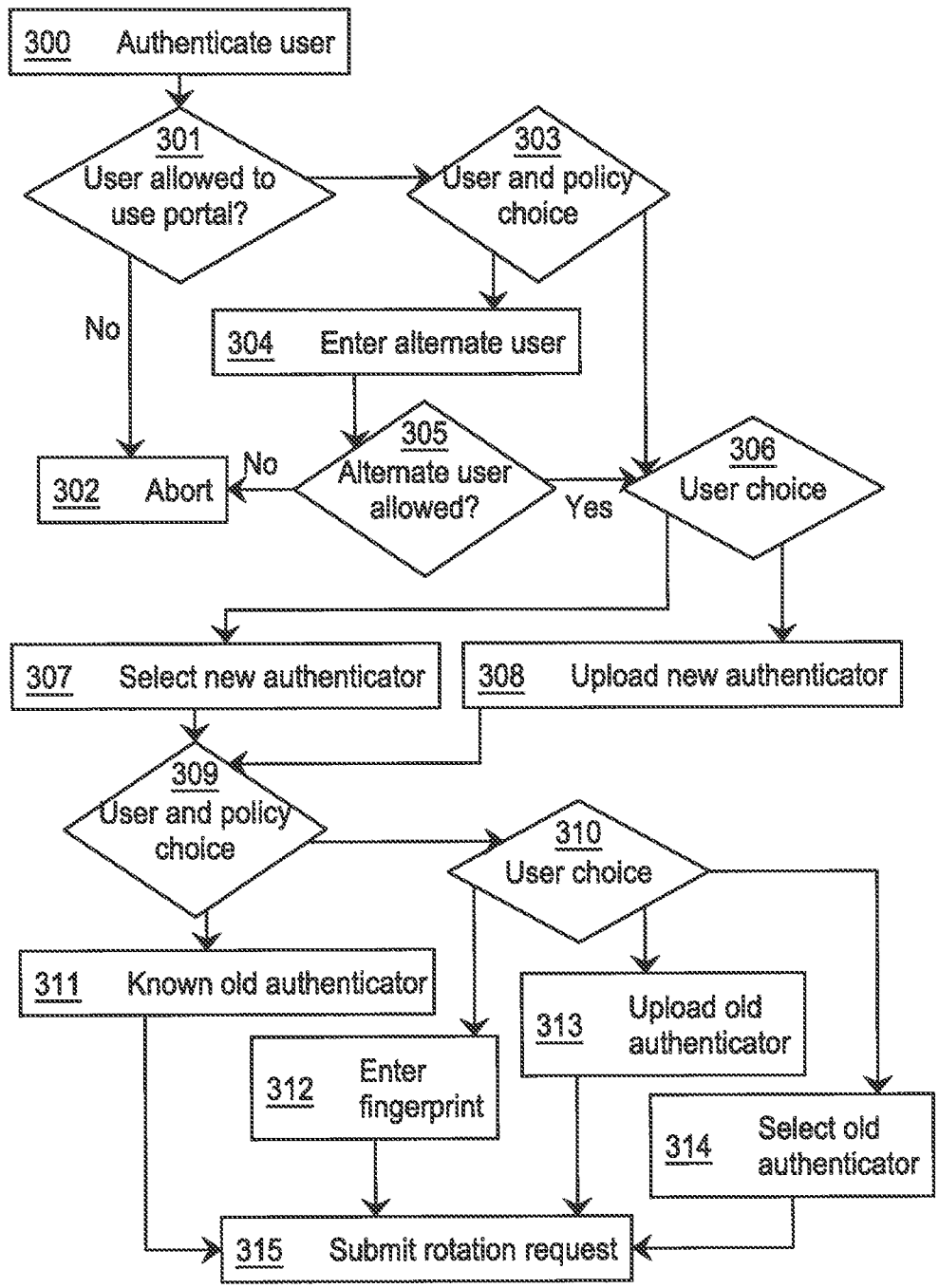
FIG. 3A illustrates a method for requesting automatic or reviewed rotation, i.e., replacement, of an existing authenticator.

Now in reference to FIG. 3A, the portal can be used also for user-initiated authenticator rotation. In this context rotation means replacement of an old authenticator with a new authenticator.

A user again authenticates itself (300), and possibly chooses to represent an alternate user instead of the authenticated user. This part of the presented method as illustrated by flow chart elements (301)-(305) is identical to that illustrated by flow chart elements (201)-(205) and its specification, being identical, is not repeated here, but a reference is made to the previously presented specification for that method part. In what follows, the term represented user should be construed to denote the second user chosen by the authenticated user if the authenticated user chose to represent a second user, and the authenticated user otherwise.

The authenticated user can then based on the authenticated user's choice (306) either upload a new authenticator (308) or select an existing authenticator (307) from previously uploaded authenticators.

Then, if it is known, based on local security policy, or technical constraints, or a database of authenticators, such as a certificate database, that the represented user has only one known old authenticator in use (309) on the hosts the request pertains to, that old authenticator can be automatically chosen as the old authenticator to be replaced (311). The authenticated user may or may not be given a possibility to change the old authenticator (309). If the represented user is not known to have exactly one old authenticator in use on the hosts the request pertains to, or the user is given a possibility to change the old authenticator, the user can then make a choice (310) to either choose an old authenticator (314) from a list of known old authenticators, or to upload an old authenticator (313) or enter it directly, or to enter the fingerprint of an old authenticator (312), the fingerprint then being matched against known old authenticators to locate the old authenticator identified by the fingerprint, or against a separate database of known authenticators. Then, the authenticated user submits the request to rotate an authenticator (315).

Figure 3B:
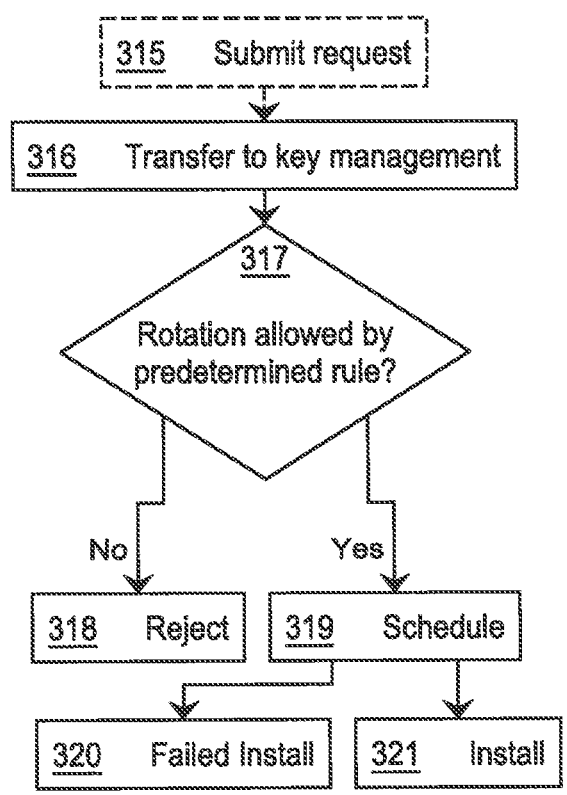
FIG. 3B illustrates a method for deciding on an authenticator rotation request after transferring it to a key management system.

Now in reference to FIG. 3B, the request, the old and the new authenticator, or the new authenticator and the fingerprint of the old authenticator, as well as information for the authenticated user and the represented user, are transferred to the key management system (316). After this, a predetermined rule (317) is used to decide if the authenticator rotation request should be accepted.

Various checks may be also performed on the new authenticator, for example, checking that it has not been used before, or that its properties conform to a predetermined policy, such as choice of cryptographic algorithms or key sizes.

If based on the predetermined rule (317) the rotation request should not be accepted, the new authenticator is not installed anywhere, but a notification can be provided to the authenticated user that the request was rejected (318), for example, by sending an automatically generated e-mail message. If the request is deemed to be allowed, it is scheduled for fulfillment (319). The scheduling decision, i.e., when to install the new authenticator on which hosts to replace the old authenticator, can depend on the configuration and features of the key management system, and different hosts can be scheduled at different times for fulfillment. It is possible that the fulfillment requests are batched together, or that they are implemented instantaneously, or that they must be manually triggered.

If the scheduled installation succeeds (321), the authenticated user can be provided with a notification, such as an e-mail message, that the authenticator has been installed successfully in place of the old authenticator for the represented user. If the installation fails (320), the authenticated user can be also notified. It is also possible that the installation succeeds only partially, for example, that some hosts were not available for installing whereas some others were. In that case, the installation can be optionally unrolled on all hosts, and the authenticated user can be notified.

This method, as illustrated in FIG. 3B, pertains to those embodiments where the administrator interface (105) is connected to the key management system (102), as illustrated in FIG. 1A, because the predetermined rule (317) may require input from an administrator, as described below.

Figure 3C:
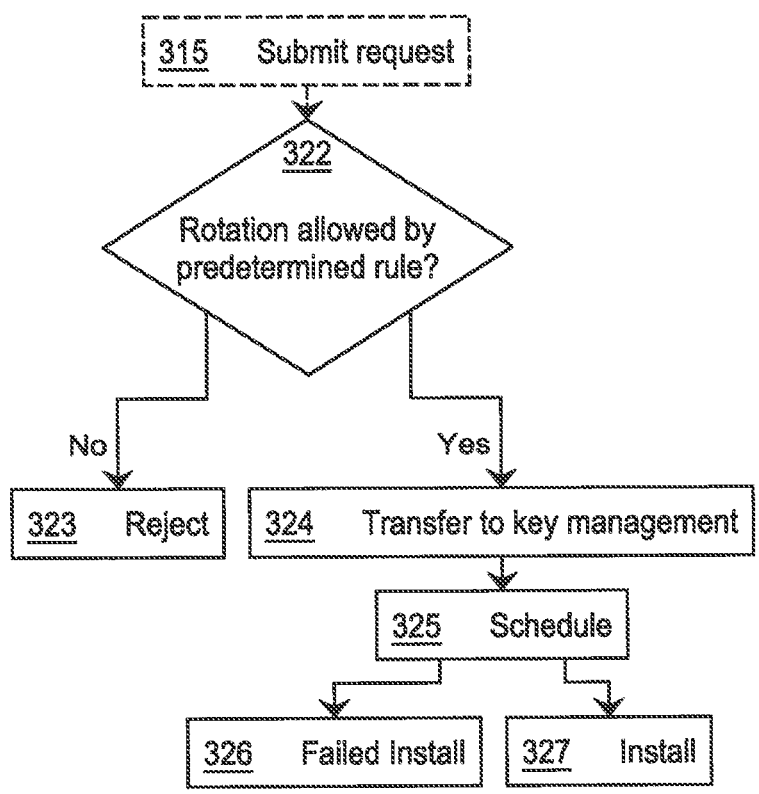
FIG. 3C illustrates a method for deciding on an authenticator rotation request before transferring it to a key management system.

FIG. 3C illustrates a variation of this method, useful in those embodiments where the arrangement illustrated in FIG. 1B is used, as in those cases the administrator interface (105) is connected to the self-service portal (100) and thus the predetermined rule (322) has to be evaluated at the self-service portal (100) because, as described below, it may require input from an administrator. If based on the predetermined rule (322) the rotation request should not be accepted the new authenticator is not installed anywhere. A notification can be provided to the authenticated user that the request was rejected (323). For example, an automatically generated e-mail message may be send. If the request is deemed to be allowed, it is transferred to key management (324) and scheduled for fulfillment (325). The scheduling decision, i.e., when to install the new authenticator on which hosts to replace the old authenticator, can depend on the configuration and features of the key management system. Different hosts can be scheduled at different times for fulfillment. It is possible to batch the fulfillment requests together. The fulfillment requests can be implemented instantaneously. According to a possibility these must be manually triggered.

If the scheduled installation succeeds (327), the authenticated user can be provided with a notification, such as an e-mail message, that the authenticator has been installed successfully in place of the old authenticator for the represented user. If the installation fails (326), the authenticated user can be also notified. It is also possible that the installation succeeds only partially, for example, that some hosts were not available for installing whereas some others were. In that case, the installation can be optionally unrolled on all hosts, and the authenticated user can be notified.

Figure 4:
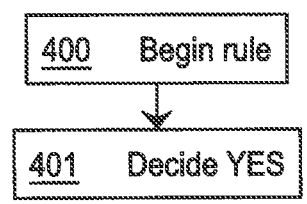
FIG. 4 illustrates a rule that always returns an affirmative answer.

In one embodiment, the key management system automatically allows for authenticator rotation, based on the fact that the user was already authenticated (300) and that the trust relationship was previously allowed, in which case the authenticator rotation is scheduled immediately (319). This predetermined rule is illustrated in FIG. 4, where the rule begins (400) and then immediately proceeds to an affirmative decision (401).

Figure 5:
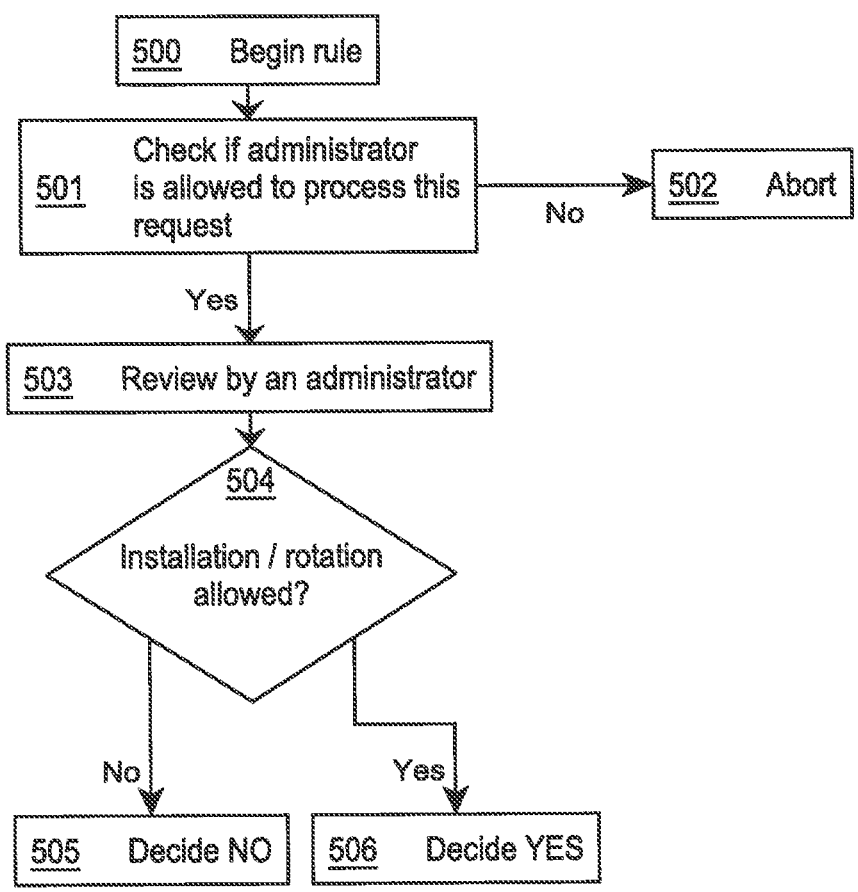
FIG. 5 illustrates a rule that returns an affirmative or negative answer based on review by an administrator user, unless the administrator user has insufficient rights to carry out the review.

In some embodiments, authenticator installation requests and authenticator rotation requests can be subject to review, as illustrated in FIG. 5 that describes a predetermined rule that can be used to decide installation requests (213), (218) as well as rotation requests (317), (322). After the rule begins (500), it is checked if an administrator accessing either the self-service portal or the key management system is allowed to process the present request (501). This check can be based, for example, on the user group to which the administrator user belongs to. If the administrator user is not allowed to process the request, the rule is aborted (502). Aborting the rule may or may not be equivalent to producing a negative decision (505); for example, an aborted request may be later relayed to another administrator for a second review. If the administrator is allowed to process the request, then the administrator user reviews the request (503) and decides if the installation or rotation request is allowed (504). The administrator user can be, for example, provided with a user interface element to either accept or reject the request. If the administrator user decides not to allow the request, the rule terminates with a negative result (505). Otherwise the rule terminates with an affirmative result (506).

Figure 6:
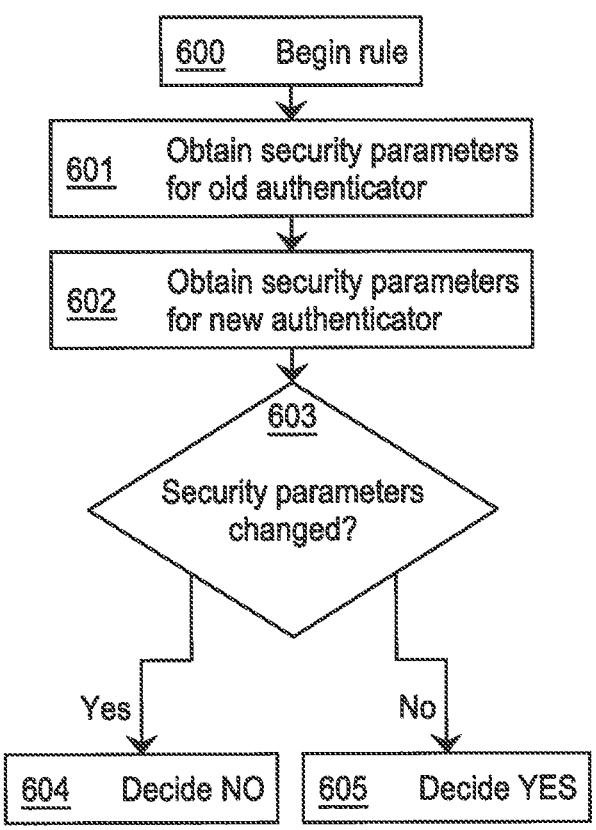
FIG. 6 illustrates a rule that returns an affirmative answer if security parameters have not been changed.

In some embodiments, rotation requests can be accepted or rejected based on conditions such as whether security parameters differ in the new authenticator from the old authenticator. For example, SSH public keys can include a command restriction that allows a user using a command restricted public key to log into a system to only execute those system commands on the system that are enumerated in the public key. Such command restriction is one type of a security parameter. Such a predetermined rule is illustrated in FIG. 6, where the rule begins (600), the security parameters for the old authenticator are obtained from the old authenticator (601), the security parameters for the new authenticator are obtained from the new authenticator (602), and then it is checked if the security parameters are changed between the old and the new authenticator (603). If yes, then the rule proceeds to a negative decision (604), whereas otherwise the rule proceeds to an affirmative decision (605).

Figure 7:
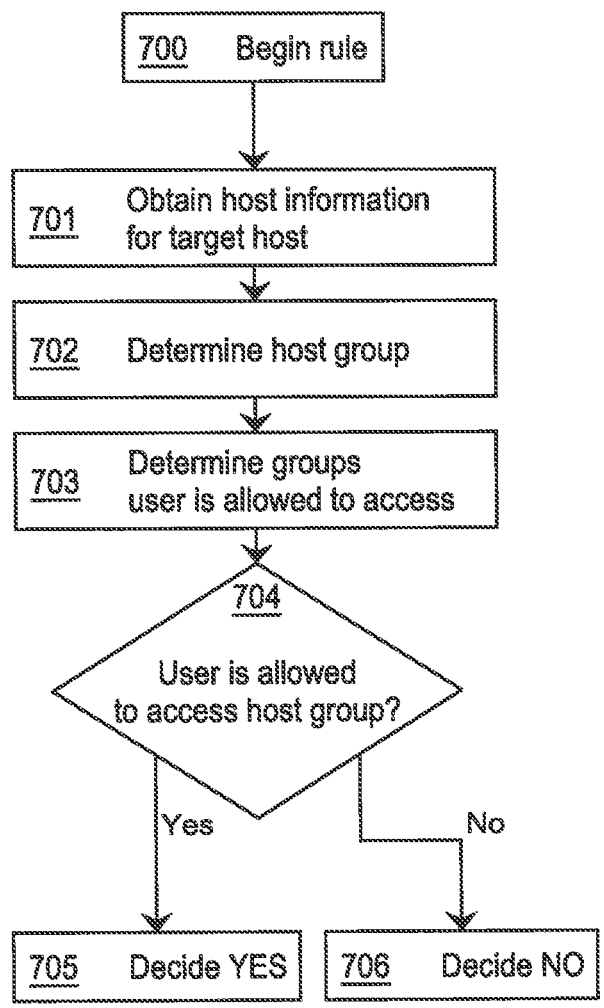
FIG. 7 illustrates a rule that returns an affirmative answer if it is determined that a given user is allowed to access a group of hosts, and a given host belongs to that group.

FIG. 7 illustrates a rule to decide if an authenticator installation request can be allowed on a single host based on the host group that the host on which the installation is requested belongs to. The rule starts (700), after which information for the target host is obtained, for example, from a configuration management database or from a directory service such as AD (701). The group to which the host belongs to is determined based on that information (702). It is then determined, based on the represented user information, which host groups the user is allowed to access (703). Then, if the represented user is allowed to access hosts within that group to which the target host belongs (704), the rule produces an affirmative answer (705), otherwise a negative answer (706).

In some embodiments, multiple different rules can be used to decide installation and rotation requests, and they can be combined. For example, it is possible to combine an automatic rule, such as the rule illustrated in FIG. 7, with a rule requiring manual work, such as the rule illustrated in FIG. 5, so that if the first rule produces a negative decision, then the second rule follows. Other similar and more complex combinations can be used.

In some embodiments, automatic reminder e-mails can be sent to users whose authenticators should be rotated, for example, based on a predetermined time period, such as three months. A key management system can be configured to lock accounts whose keys have not been rotated within a predetermined time period since a notification e-mail has been sent, providing the advantage that an account whose authenticator might be compromised because it is too old would be more resilient towards breaking into it.

Figure 9:
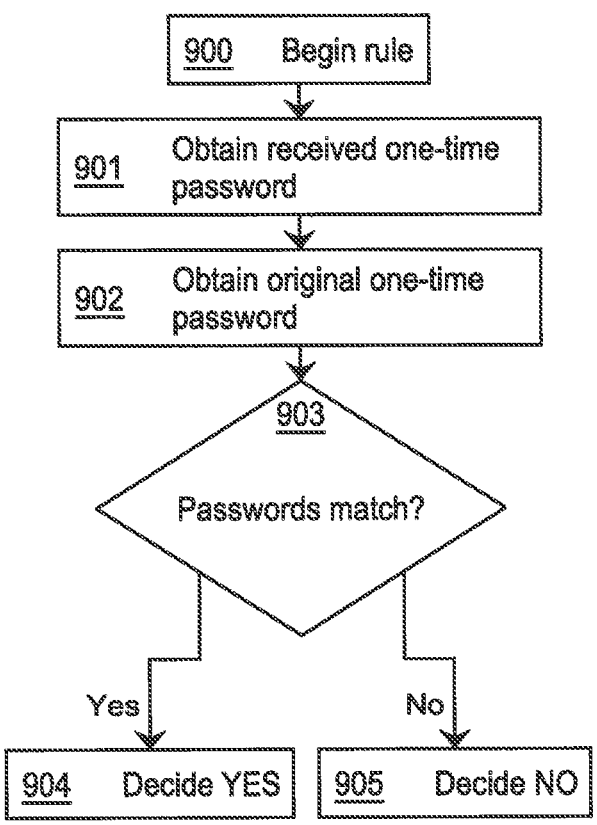
FIG. 9 illustrates a rule that returns an affirmative answer if a one-time password matches with a known one.

In some embodiments, one-time passwords (OTPs) can be used to enable provisioning of authenticators to external users. An external user who needs to have an authenticator installed within the managed network is provided first with an OTP, for example, by sending it within an encrypted e-mail, or sending it via courier mail. The external user then enters the OTP as part of the request to install an authenticator (209). The rule illustrated in FIG. 9 is then used, either in itself or in combination with other rules, to decide if an authenticator can be installed. Typically, the external user would be allowed to install an authenticator only on a predetermined set of hosts. After this rule begins (900), the OTP that was obtained as part of the request to install a new authenticator is obtained (901) from the request. Then the OTP that was originally sent to the external user is obtained (902), for example, by looking it up from a database. Then the two passwords are compared (903). If they match, the rule produces an affirmative result (904), otherwise a negative result (905).

Alternatively, instead of comparing OTPs directly, it is possible to compare their cryptographic hash values in an arrangement where the original OTP is not stored as such, but only its cryptographic hash value is stored for later reference.

In all cases, there can be policies configured into the key management system that can further control which keys can be installed on which hosts and in which roles, and they may or may not be allowed to be overridden by administrator users.

Figure 8:
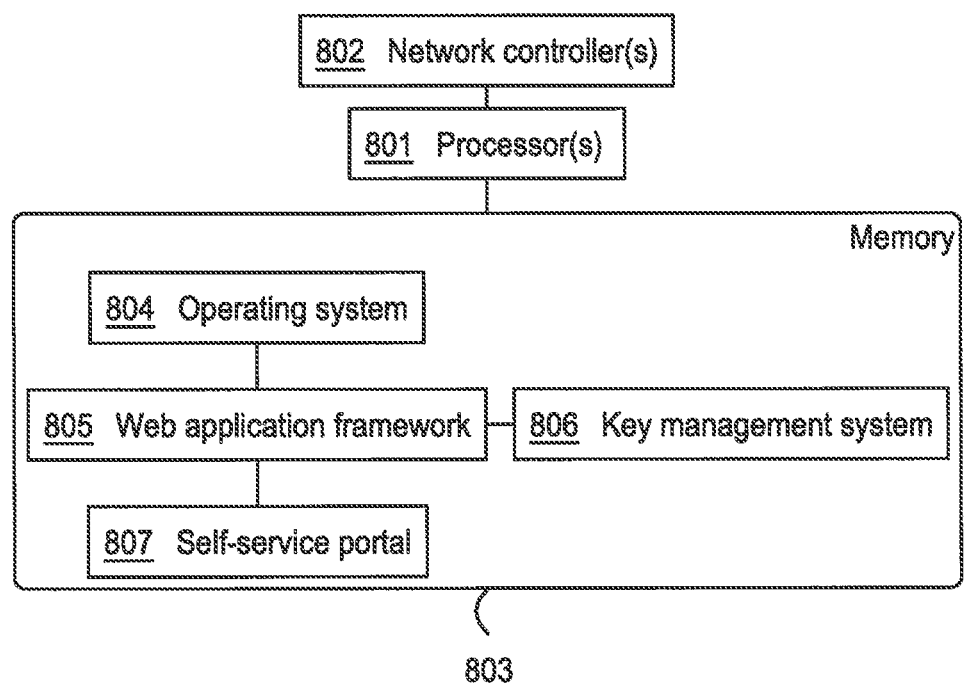
FIG. 8 illustrates a computer whose memory contents comprise executable code to provide key management and key self-service portal services.

Referring to FIG. 8, in one embodiment, a computer system comprising of one or more processors (801), one or more network controllers (802), and a memory (803) is configured so that the memory (803) contains computer-readable executable code to provide an operating system (804), a web application framework (805), a key management system (806), and a self-service portal (807), where the key management system and the self-service portal are substantially providing the methods described above. The operating system (804) can be, for example, Linux™, FreeBSD™, or a Windows™ operating system. The web application framework (805) can be Django™. The key management system (806) and the self-service portal (807) can be implemented as Python™ code executing in reference to a Django™ framework.

An apparatus may provide computer program code implementing any of the method embodiments for downloading over a data communications network.

In an embodiment, a non-transitory computer-readable medium comprises of computer-readable executable code for causing a computer to perform one or more steps of any of the method embodiments described herein.

At least one user can comprises a machine type terminal. An example of machine type terminal and machine to machine communications are devices sending and/or receiving data relating to their operation and/or control. Machine type communications can be for example automated communications that require no human intervention.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. When certain steps are said to be performed by a computer, they could equivalently be performed by two or more related computers, one causing another to perform certain operations. Steps in flowcharts could be implemented, e.g., as state machine states, logic circuits, or optics in hardware components, as instructions, subprograms, or processes executed by a processor, or a combination of these and other techniques.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an apparatus, or a computer program product which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

A computer may be any general or special purpose computer, workstation, server, laptop, handheld device, smartphone, wearable computer, embedded computer, a system of computers (e.g., a computer cluster, possibly comprising many racks of computing nodes), distributed computer, computerized control system, processor, a machine type device or other similar apparatus capable of performing data processing.

Computer-readable media can include, e.g., computer-readable magnetic data storage media (e.g., floppies, disk drives, tapes), computer-readable optical data storage media (e.g., disks, tapes, holograms, crystals, strips), semiconductor memories (such as flash memory, memristor memory, and various ROM and RAM technologies), media accessible through an I/O interface in a computer, media accessible through a network interface in a computer, networked file servers from which at least some of the content can be accessed by another computer, data buffered, cached, or in transit through a computer network, or any other media that can be accessed by a computer.

The various methods may be claimed, e.g., from the perspective of the portal module, from the perspective of the key manager, as their combination, from the perspective of the user agent (user's browser or other client program), or the combination of all of them. The invention may also be claimed as a method or computer system providing computer readable program code for implementing method steps of any of the described embodiments on one or more computers. Selecting generally has its normal meaning, with the extension that selecting from one alternative means taking that alternative (or in some embodiments there may also be the option of selecting nothing), and selecting from no alternatives means, e.g., returning a value indicating no selection or triggering an error message.

What is claimed is:

1. A method for provisioning authenticators for enabling access to at least one remote host in a computerized system, comprising:

receiving, from a user device of a user and at a self-service portal, a request for an authenticator to be provisioned to enable the user device to access the at least one remote host, wherein the self-service portal provides a user interface for input of the request for the authenticator to be provisioned for the user;

transmitting, to an authenticator manager that is configured to provision authenticators for the at least one remote host and from the self-service portal, the request for the authenticator to be provisioned, wherein the self-service portal is located between the user device and the authenticator manager, wherein the authenticator manager or the self-service portal provides an administrator interface for an administrator, and wherein the request is processed by the authenticator manager only after an administration process according to a predefined rule for acceptability of the request without intervention by the administrator via the administrator interface, determining, by the administration process, acceptability of the request without intervention by the administrator, in response to determining that the request cannot be accepted without intervention by the administrator, causing, by the authenticator manager or the self-service portal, presentation of the administrator interface to the administrator, and provisioning, by the authenticator manager, to the self-service portal, and for the user, the authenticator for enabling the user to access to the at least one remote host in accordance with acceptance of the request by the user after the request for the authenticator has been accepted by the administration process in response to the acceptance, input via the administrator interface, from the administrator.

2. The method of claim 1, comprising accepting the request by the administration process at the authenticator manager.

3. The method of claim 1, comprising receiving the acceptance input via the administrator interface provided by the authenticator manager and processing the administration process at the authenticator manager.

4. The method of claim 1, wherein the authenticator comprises an access key, and providing the access key comprises one of generating the access key, uploading the access key, replacing the access key by another access key, rotating access keys, and modifying the access key.

5. The method of claim 1, wherein the authenticator comprises one of a public key, a shared symmetric cryptographic key, a reference to an external authentication system, an identifier of a public key corresponding to a private key stored on a memory, and a key pair according to a public key cryptosystem as represented by identification of the public key.

6. The method of claim 1, wherein the request comprises at least one of identification of one or more remote target hosts, identification of one or more target user accounts, and one or more restrictions on use of the authenticator.

7. The method of claim 1, wherein providing the authenticator comprises installing the authenticator in the user device.

8. The method of claim 1, wherein the request is made on behalf of a second user.

9. The method of claim 1, wherein the user device comprises a machine type terminal.

10. A method for provisioning authenticators for enabling access to at least one remote host in a computerized system, comprising:
receiving, from a user device of a user and at a self-service portal located between the user device and an authenticator manager that is configured to manage authenticators for the at least one remote host, a request for an authenticator to be provisioned for the user device to enable the user to access the at least one remote host in the computerized system, wherein the self-service portal provides a user interface for the user for input of the request, and wherein the authenticator manager or the self-service portal provides an administrator interface for an administrator,
verifying a right of the user to make the request by the self-service portal,
in response to determining that the request cannot be accepted without intervention by the administrator, causing presentation of the administrator interface to the administrator for acceptance of the request, and
in response to an authorization by the administrator via the presented administrator interface, sending the request, from the self-service portal and to the authenticator manager, to trigger the requested provisioning of the authenticator to enable access to the at least one remote host in accordance with the request, wherein the acceptance of the request comprises an administration process according to a predefined rule that requires an acceptance input from the administrator via the administrator interface before provisioning the authenticator.

11. The method of claim 10, comprising accepting the request by the administration process at the self-service portal.

12. The method of claim 10, wherein the verification comprises enquiring a directory service by the self-service portal.

13. The method of claim 10, comprising receiving the acceptance input via the administrator interface provided by the self-service portal.

14. The method of claim 10, wherein the authenticator comprises an access key comprising one of a newly generated access key, an uploaded access key, a replacement access key, an access key from a rotation list of access keys, and a modified access key, and wherein any of such keys comprises one of a public key, a shared symmetric cryptographic key, a reference to an external authentication system, an identifier of a public key corresponding to a private key stored on a memory, and a key pair according to a public key cryptosystem as represented by identification of the public key.

15. The method of claim 10, wherein the request is made on behalf of a second user, the method comprising verifying the right of the user to make a request on behalf of the second user.

16. An authenticator manager apparatus comprising at least one processor and at least one memory, said memory being connected to said processor and including computer-readable executable program code for causing the apparatus at least to provision authenticators for enabling users to access remote hosts in a computerized system, the provisioning comprising:
receiving, by the authenticator manager apparatus, based on a user request from a user device of a user and from a self-service portal located between the user device and the authenticator manager apparatus, a request for an authenticator to be provisioned for the user to enable the user to access to at least one remote host in the computerized system, wherein the self-service portal provides a user interface for the user to input the request for the authenticator,
determining acceptability of the request without intervention by an administrator,
in response to a determination that the request cannot be accepted without intervention by the administrator, causing presentation of an administrator interface to the administrator, wherein the authenticator manager apparatus provides the administrator interface for the administrator, and
provisioning, to the self-service portal, and after authorization by the self-service portal of a right of the user to make the request and after acceptance of the request for the authenticator to be provisioned for the user by an administration process according to a predefined rule for acceptability of the request without intervention by the administrator via the administrator interface, the authenticator for enabling access to the at least one remote host.

17. The apparatus of claim 16, configured to provide the administration process.

18. The apparatus of claim 16, wherein the authenticator comprises an access key comprising one of a generated access key, an uploaded access key, a replacement access key, a rotated access key, and a modified access key.

19. The apparatus of claim 16, wherein the user device comprises a machine type terminal.

20. A self-service portal apparatus in a computerized system, the self-service portal apparatus comprising at least one processor and at least one memory, said memory being connected to said processor and including computer-readable executable program code for causing the self-service portal apparatus at least to:

receive, from a user device of a user and at the self-service portal apparatus located between the user device and an authenticator manager that is configured to manage authenticators for the at least one remote host, a request for an authenticator to be provisioned for the user for enabling the user to access to at least one remote host in the computerized system, wherein the self-service portal apparatus provides, via the user device, a user interface for the user to input the request for an authenticator to be provisioned for the user, and wherein the self-service portal apparatus provides an administrator interface for an administrator, verify a right of the user to make the request to determine whether the request can be accepted without intervention by the administrator, in response to determining that the request cannot be accepted without intervention by the administrator, cause presentation of the administrator interface to the administrator for acceptance of the request, wherein the acceptance of the request comprises an administration process according to a predefined rule that requires an acceptance input from the administrator via the administrator interface before provisioning of the authenticator, and in response to authorization by the administrator via the administrator interface, sending the request to the authenticator manager to trigger the requested provisioning of the authenticator to enable access to the at least one remote host in accordance with the request.

21. The apparatus of claim 20, configured to provide the administration process.

22. The apparatus of claim 20, configured to enquire a directory service when verifying the right of the user to make the request.

23. The apparatus of claim 20, wherein the user device comprises a machine type terminal.

24. The apparatus of claim 20, configured to process requests made on behalf of a second user.

25. The apparatus of claim 24, wherein the second user comprises a machine type terminal.

26. A self-service portal apparatus in a computerized system, the self- service portal apparatus comprising at least one processor and at least one memory, said memory being connected to said processor and including computer-readable executable program code for causing the self-service portal apparatus at least to:

receive, from a user device of a user and at the self-service portal apparatus located between the user device and an authenticator manager that is configured to manage authenticators for at least one remote host, a request for an authenticator to be provisioned for the user for enabling the user to access to the at least one remote host in the computerized system, wherein the self-service portal apparatus provides, via the user device, a user interface for the user to input the request for the authenticator to be provisioned for the user, and wherein the self-service portal apparatus provides an administrator interface for an administrator, verify a right of the user to make the request to determine whether the request can be accepted without intervention by the administrator, in response to determining that the request cannot be accepted without intervention by the administrator, cause presentation of the administrator interface to the administrator for acceptance of the request, wherein the acceptance of the request comprises an administration process according to a predefined rule that requires an acceptance input from the administrator via the administrator interface before provisioning of the authenticator, and in response to authorization by the administrator via the administrator interface, sending the request to the authenticator manager to trigger the requested provisioning of the authenticator to enable access to the at least one remote host in accordance with the request.

27. A non-transitory computer program product stored on a computer-readable medium comprising computer-readable program code operable to cause a computer to:

receive, from a user device and at a self-service portal located between the user device and an authenticator manager that is configured to manage authenticators for at least one remote host, a request for an authenticator to be provisioned for the user device to enable a user to access the at least one remote host in a computerized system, wherein the self-service portal provides a user interface for input of the request for the authenticator to be provisioned for the user and wherein the authenticator manager or the self-service portal provides an administrator interface for an administrator, verify a right of the user to make the request by the self-service portal, in response to a determination that the request cannot be accepted without intervention by the administrator, causing presentation of the administrator interface to the administrator, wherein acceptance of the request by an administration process according to a predefined rule requires an acceptance input from the administrator via the administrator interface before provisioning of the authenticator, and in response to an authorization by the administrator via the presented administrator interface, send the request to the authenticator manager to trigger provisioning of the authenticator, by the authenticator manager and to the self-service portal, to enable access to the at least one remote host in accordance with the request.

* * * * *

UNITED STATES PATENT AND TRADEMARK OFFICE
CERTIFICATE OF CORRECTION

| | | |
|---|---|---|
| PATENT NO. | : 10,681,023 B2 | Page 1 of 2 |
| APPLICATION NO. | : 14/319319 | |
| DATED | : June 9, 2020 | |
| INVENTOR(S) | : Roman Hernandez et al. | |

It is certified that error appears in the above-identified patent and that said Letters Patent is hereby corrected as shown below:

In the Claims

Column 15, Claim 20, Line 8:
Delete "for the at least" and insert --for at least--

Column 15, Claim 20, Line 10:
Delete "to at least" and insert --to the at least--

Column 15, Claim 20, Line 13:
Delete "request for an" and insert --request for the--

Column 16, Claim 27, Line 36:
Delete "user and" and insert --user, and--

Column 15, Line 45 to Column 16, Line 24, Claim 26:
Delete the text beginning with "26. A self-service portal apparatus", in Column 15, Line 45, to and ending with "in accordance with the request." in Column 16, Line 24, and insert the following claim:
--26. A non-transitory computer program product stored on a computer-readable medium comprising computer-readable program code operable to cause a computer to:
    receive, at an authenticator manager that is configured to provision authenticators for access to at least one remote host, from a user device of a user, and via a self-service portal, a request for an authenticator to be provisioned for the user to enable the user to access to the at least one remote host in a computerized system, wherein the request can be processed by the authenticator manager only after authorization of the user to make the request by the self-service portal and acceptance of the request for the authenticator by an administration process according to a predefined rule for acceptability of the request without intervention by an administrator via an administrator interface, and wherein the self-service portal provides the user device a user interface for input of the request and the authenticator manager or the self-service portal provides the administrator interface for the administrator,
    determine acceptability of the request without intervention by the administrator, Signed and Sealed this
Second Day of March, 2021

Drew Hirshfeld
*Performing the Functions and Duties of the
Under Secretary of Commerce for Intellectual Property and
Director of the United States Patent and Trademark Office* in response to determining that the request cannot be accepted without intervention by the administrator, causing presentation of the administrator interface to the administrator, and provision for the user the authenticator, for enabling the user to access to the at least one remote host, in accordance with the acceptance of the request by the user and after the request for the authenticator has been accepted by the administration process in response to the acceptance, input via the administrator interface, from the administrator.--